United States Patent

[11] 3,625,244

| [72] | Inventor | Harry L. Giwosky<br>Milwaukee, Wis. |
|---|---|---|
| [21] | Appl. No. | 52,603 |
| [22] | Filed | July 6, 1970 |
| [45] | Patented | Dec. 7, 1971 |
| [73] | Assignee | Controls Company of America<br>Melrose Park, Ill. |

[54] OIL CONTROL VALVE FLOW METERING ARRANGEMENT
6 Claims, 4 Drawing Figs.

[52] U.S. Cl. ............................................. 137/405, 251/206
[51] Int. Cl. .............................................. F16k 11/02
[50] Field of Search ........................................ 137/400, 405, 409; 251/206, 207

[56] References Cited
UNITED STATES PATENTS

| 784,228 | 3/1905 | Richwood ................... | 251/206 |
| 934,932 | 9/1909 | Osbourn....................... | 251/206 |
| 2,930,388 | 3/1960 | Biermann et al............. | 137/400 X |
| 2,685,891 | 8/1954 | Segelhorst et al............ | 251/206 X |
| 3,018,796 | 1/1962 | Loup............................ | 251/206 X |
| 2,510,356 | 6/1950 | Werts........................... | 251/206 X |

FOREIGN PATENTS

| 840,452 | 7/1960 | Great Britain................ | 137/400 |

Primary Examiner—M. Cary Nelson
Assistant Examiner—David R. Matthews
Attorneys—John W. Michael, Gerrit D. Foster, Bayard H. Michael, Paul R. Puerner, Joseph A. Gemignani, Andrew O. Riteris and Spencer B. Michael ABSTRACT: Oil flows into the control valve body past the float controlled inlet valve to maintain a constant level in the body. The thin metering disc is rotatable to multiple positions in which a metering orifice underlies the float chamber outlet to accurately meter the flow. The undulating track cast in the body cooperates with the spring-loaded rollers on the bottom of the metering stem to give a detent action to registry of the metering holes. When the knob is turned to "off" the spring arm acts on the link to lift the float and force the inlet valve closed. If the oil level rises too high (due to leaking inlet valve), the inverted, L-shaped safety float flips clockwise to wedge in the valve-closing position until manually reset.

PATENTED DEC 7 1971

Inventor
Harry L. Giwosky
By Bayard H. Michael
Attorney

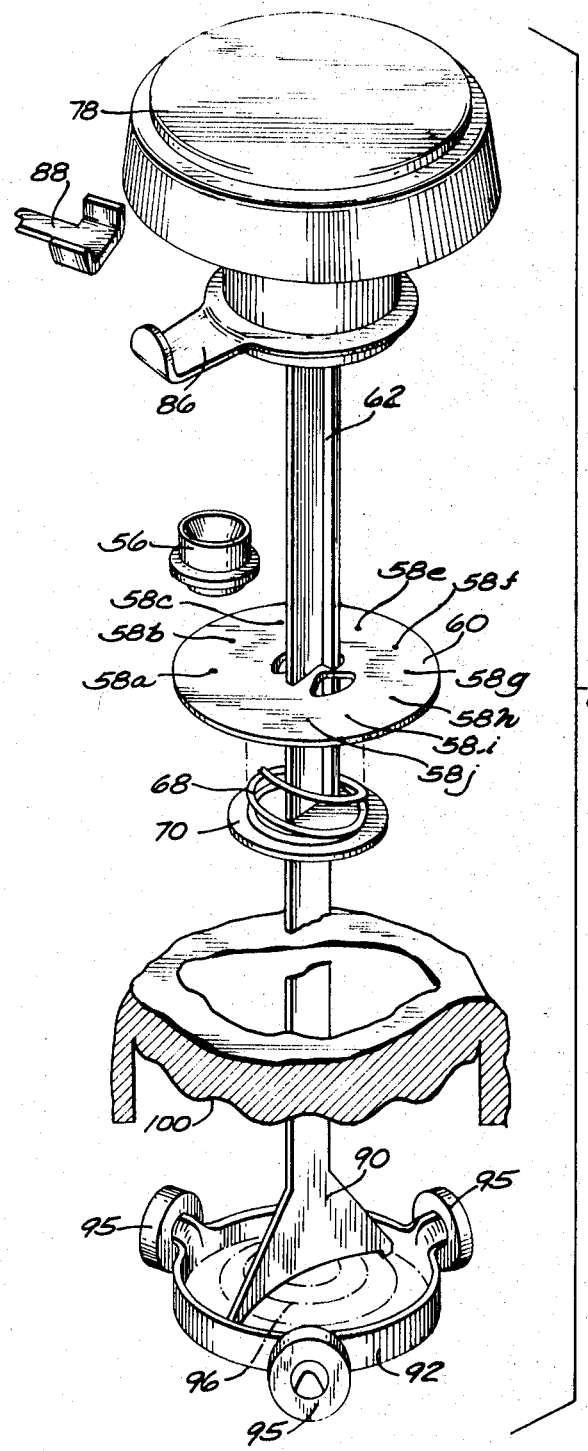

OIL CONTROL VALVE FLOW METERING ARRANGEMENT

CROSS-REFERENCE TO RELATED APPLICATION

The safety float arrangement is described in greater detail and claimed in my application Ser. No. 52,602

BACKGROUND OF INVENTION

The accuracy requirements for metering oil flow in control valves used in conjunction with space-heating devices have increased. If the desired accuracy is to be obtained, particularly at the very low flow rates, any effort to solve the problem in conjunction with a needle valve or the like results in a valve configuration requiring very large needle travel with consequent mechanical problems coupled with problems in connection with viscosity variation of the oil. The longer the flow path through the metering device, the greater the viscosity effect on the flow rate.

SUMMARY OF INVENTION

The present invention is directed to providing maximum metering accuracy over the requisite range combined with minimizing the effect of viscosity variation of the oil. The construction described in the abstract achieves very accurate metering by providing accurate metering orifices in a thin plate which is rotated to register the desired one of the orifices with the outlet from the float chamber. Since the orifices can be stamped with great accuracy while obtaining sharp corners entering and leaving the orifice, the metering is bound to fall within the designed-for limit. Since the plate can be very thin with consequent short metering path, viscosity considerations are minimized.

The metering disc is spring loaded against a resilient outlet which cleans the disc as the plate is rotated. This self-cleaning action is very beneficial.

In order to obtain a good detent action insuring registration of the desired orifice with the outlet while additionally providing good "feel," the shaft between the manual knob and the disc is torsionally stiff while the shaft extension to the detent wheel carrier is torsionally resilient. This, coupled with the wheels rolling over the undulating surface cast on the underside of the valve body, eliminates the possibility of "parking" the knob at a position between orifice positions. If almost on the peak, the resilience of the shaft will act to return it to the position from which it came. When the wheels reach the peak, the resilience will cause the wheel carrier to catch up with the knob and this results in the system going over center to the next orifice position.

DESCRIPTION OF DRAWINGS

FIG. 4 is an exploded perspective illustrating the essential features of the present arrangement.

DESCRIPTION OF PREFERRED EMBODIMENT

Figure 2:
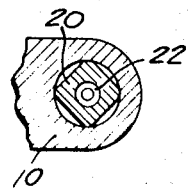
FIG. 2 is a fragmentary section taken on line 2—2 of FIG. 1 illustrating the configuration of the inlet valve.

Oil enters the control valve body 10 through inlet 12 and passes through filter 14 to flow upwardly through bore 16 to the pressed-in valve seat 18. Valve 20 includes resilient tip 22 which is moved towards and from the seat 18 to meter flow in accordance with the motion imparted to the valve by float 24. Flow past the resilient valve face passes between the square valve stem and the circular bore in which the valve operates (FIG. 2). The upper end of the valve is provided with a plate 26 and spring 28 is compressed between that plate and the body to urge the valve in the open direction. The foam float is mounted on the bracket 30 which is pivoted at 32 and is provided with an adjustable valve actuator 34. As the float rises due to an increasing level in the valve body, the actuator 34 will act on valve 20 to close the valve and shut off flow to the float chamber 36.

Safety float 38 is pivoted at 40 and under normal operating conditions the oil level (indicated by the dashed line 42) submerges only the lower or depending leg 44 of the safety float and its center of buoyancy is to the right of pivot 40 and moves the safety float against stop 46. This buoyancy is added to the buoyancy of the main float 24 in normal operation. If, however, the inlet valve leaks and the oil level starts to rise, the other leg 48 of the safety float becomes submerged and ultimately the center of buoyancy of the float moves to the left of the pivot 40 whereupon the float swings in a clockwise direction until the lower corner of the safety float wedges against body surface 50. Under this condition the control cannot be placed into operation until the level is restored to normal and the safety float is returned to the illustrated position by moving the reset 52 against the upwardly projecting arm 54 of the safety float.

A suitable plastic outlet 56 is pressed into the bottom of float chamber 36 and leads to one of the metering orifices 58a through 58j or a blank in the plate 60. The plate is connected to the angle section portion of shaft 62 by merely loosely fitting the shaft through a suitable cutout in the plate. The cavity 64 in which the plate is mounted is provided with two bosses 66 (only one of which is shown) equally spaced from the outlet 56 to give the plate a three-point support. The plate is loose on shaft 62 so that spring 68 can urge the plate upwardly into firm contact with the resilient outlet 56. The spring is compressed between the plate and seat 70 retained on the shaft by bending out a tab 72 to limit the downward movement of the plate relative to the shaft. The oil flowing past the metering plate leaves chamber 64 through outlet 74. Any air entrained in the oil can escape through the central standpipe 76 which also serves as an overflow if leakage at the inlet continues after operation of the safety float. The upper end of shaft 62 is secured in knob 78 which is accessible from above the cover 80. The spring 82 compressed between the underside of cover 80 and plate 84 connected to the knob acts to hold the knob down. The laterally projecting finger 86 will, in the "off" position of the knob, move under link 88 to resiliently lift the float and exert the spring force through the float lever and actuator onto the inlet valve to force the inlet valve closed.

Figure 1:
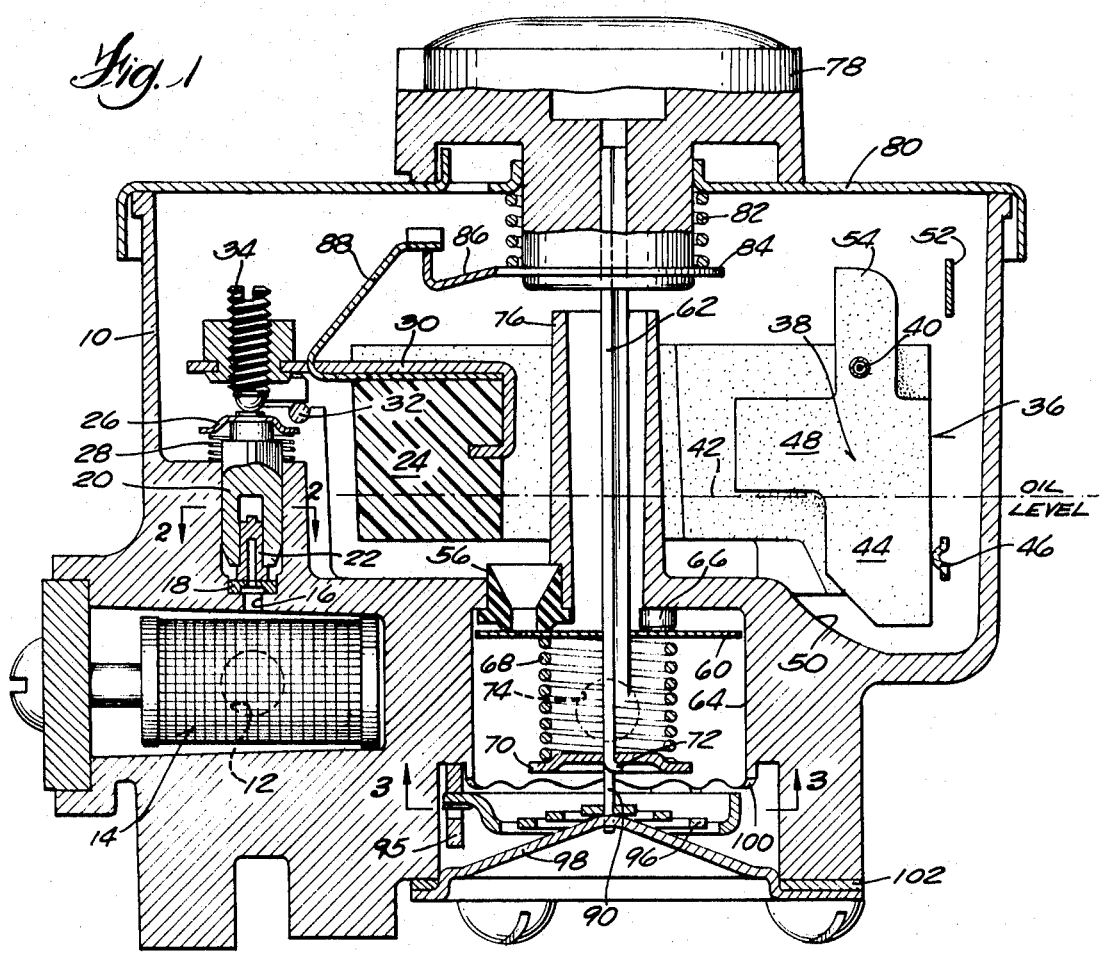
FIG. 1 is a vertical section through an oil control valve according to this invention.
Figure 3:
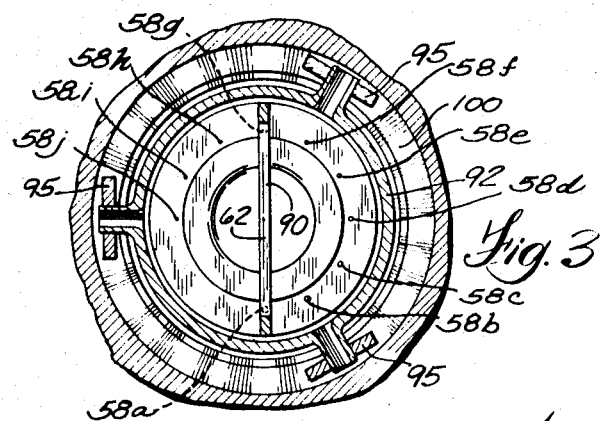
FIG. 3 is a section taken as indicated by line 3—3 of FIG. 1 to illustrate the wheel carrier and the undulating track giving the detent action.

As may be seen in FIGS. 3 and 4, the lower end of shaft 62 is in the form of a spanner 90 which connects to the circular wheel support 92 from which three hubs are formed to support rollers 94. The central portion of the support is in the form of a serpentine spring member 96 against which the inverted, dished bottom cover 98 acts, as may be seen in FIG. 1. This urges the wheel carrier upwardly to maintain the three wheels in contact with the serpentine track 100 cast in the body. The peaks and valleys of this track cooperate with the wheels in insuring that the disc will always be parked in one of the desired positions. Gasket 102 is provided between the bottom cover 98 and the body to seal the outlet chamber 64.

It will be noted that the lower portion of the stem 62 is flat whereas the upper portion, that is, the portion between the metering disc 60 and the knob, is angular in cross section. This angular arrangement provides torsional rigidity whereas the flat stem can be twisted easily and this aids the detent action by allowing some twist to occur as the knob is actuated and the wheels are trying to roll uphill. This gives a slight resistance and if the knob stopped in what would appear to be a midpoint, the stored energy in the spring urging the rollers toward the bottom of the undulating track will force the wheels to roll back "downhill" to the position from which the disc had been rotated. On the other hand, if the knob is rotated a little past the midpoint, the resilience will allow the twist to unwind and insure that the wheels roll over the top of the hump or hill in the undulated portion of the body.

It will be noted that the disc 60 is flat and is very thin and, hence, the metering flow path (determined by the thickness of the plate) is relatively unaffected by the viscosity of the oil. In practice, the thickness is 0.01 inches. The holes are illustrated as being quite small and progressing from the smallest, 58a, to the largest, 58j, range from 0.016 inches to 0.047 inches in one version of the control. All of these are substantially smaller than the orifice provided by fitting 56 leading from the flow chamber and, therefore, the flow characteristic through the outlet fitting has little bearing on the metering characteristic of the orifices. These orifices can be punched with extreme accuracy and, therefore, the flow rate can be readily predetermined. The accuracy is such that there is no need to calibrate each control with oil prior to shipment, as has been the past practice. The flow characteristics are so predictable any calibration can be conducted on the basis of air testing. The cost saving is appreciable.

A further advantage of this construction resides in the fact that as the disc is rotated it is wiped against the resilient outlet with what may be called a squeegee action. This cleans the plate and the orifices insuring good accuracy over a long service life.

I claim:

1. In an oil control of the type having a float in a chamber regulating an inlet valve to maintain a constant level in the chamber to maintain a constant head on an outlet from the chamber, the improvement comprising a very thin flat plate positioned at said outlet and having a multiplicity of metering orifices therein, means for moving the plate to register a selected one of the orifices into registry with the outlet, the area of said outlet being substantially greater than the area of the largest of said metering orifices whereby the flow characteristics through the outlet have no effect on the metering through the selected orifices and the flow through the selected orifice is relatively unaffected by changes in the viscosity of the oil.

2. A control according to claim 1, in which the outlet is resilient and the plate is spring loaded against the outlet whereby rotation of the disc wipes the disc against the resilient outlet to effect a cleaning action.

3. A control according to claim 1 in which the plate is circular and the orifices are located about the center for rotation into registry with the outlet as the plate is rotated, a manually actuatable knob on the exterior of the control, a shaft connecting the knob and plate, and detent means for constraining the static positioning of the plate to orifice registry positions or to a blank position corresponding to "off."

4. In an oil control of the type having a float in a chamber regulating an inlet valve to maintain a constant level in the chamber to maintain a constant head on an outlet from the chamber, the improvement comprising a flat circular plate positioned at said outlet and having a multiplicity of metering orifices therein, said orifices being located about the center of the plate for rotation into registry with the outlet as the plate is rotated, a manually actuatable knob on the exterior of the control, a shaft connecting the knob and the plate whereby the knob may be actuated to rotate the plate to register a selected one of the orifices into registry with the outlet, and detent means constraining the static position of the plate to orifice registry positions or to a blank position corresponding to "off,"

said detent means including an undulating surface member, a roller member arranged to roll on the surface member, spring means urging the members into contact, one of the members being fixed and the other being rotatable with the plate.

5. A control according to claim 4 in which said other member is connected to said shaft, said shaft being torsionally rigid between the knob and plate and being torsionally resiliently flexible between the knob and plate on the one hand and said other member on the other hand whereby the stored energy in the flexible portion renders the detent means unstable in any position other than when the roller member is bottomed on the undulating surface.

6. A control according to claim 5 including means operative between the knob and the inlet valve to close the inlet valve when the knob is in its off position with no orifice in registry with said outlet.

* * * * *